(12) United States Patent
Meurer

(10) Patent No.: US 9,656,190 B2
(45) Date of Patent: *May 23, 2017

(54) UNDERDRAIN ASSEMBLY AND METHOD OF MANUFACTURING THE SAME

(71) Applicant: Charles Lonnie Meurer, Golden, CO (US)

(72) Inventor: Charles Lonnie Meurer, Golden, CO (US)

(73) Assignee: Meurer Research, Inc., Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,934

(22) Filed: Mar. 17, 2016

(65) Prior Publication Data

US 2016/0193550 A1    Jul. 7, 2016

Related U.S. Application Data

(63) Continuation of application No. 14/290,726, filed on May 29, 2014, now Pat. No. 9,320,991.

(60) Provisional application No. 61/828,577, filed on May 29, 2013.

(51) Int. Cl.
*B01D 24/24* (2006.01)
*B01D 24/46* (2006.01)
*E03B 3/18* (2006.01)

(52) U.S. Cl.
CPC ......... *B01D 24/24* (2013.01); *B01D 24/4636* (2013.01); *E03B 3/18* (2013.01)

(58) Field of Classification Search
USPC ...... 405/43–46; 210/291, 292; 138/110, 115, 138/116, 105, 106
See application file for complete search history.

(56) References Cited

U.S. PATENT DOCUMENTS

| | | | |
|---|---|---|---|
| 6,797,166 B1* | 9/2004 | Hambley | B01D 24/001 |
| | | | 210/274 |
| 2002/0025225 A1* | 2/2002 | Bevilacqua | F16L 9/003 |
| | | | 405/36 |

* cited by examiner

*Primary Examiner* — Sean Andrish
(74) *Attorney, Agent, or Firm* — Sheridan Ross P.C.

(57) ABSTRACT

An underdrain apparatus and a method for manufacturing such apparatus are provided. The underdrain apparatus can be extruded in long sections as a unitary part. The underdrain apparatus may be extruded in various sizes, shapes, and materials. Further, the underdrain apparatus may include a passageway for transporting water to and from the filter media and/or air to the filter media. In some embodiments, apertures are formed in the underdrain apparatus during an extrusion process to provide a path between the passageway and the filter media.

9 Claims, 4 Drawing Sheets

UNDERDRAIN ASSEMBLY AND METHOD OF MANUFACTURING THE SAME

CROSS-REFERENCE TO RELATED APPLICATION

The present application is a continuation of U.S. patent application Ser. No. 14/290,726, filed May 29, 2014, which claims priority from U.S. Provisional Application No. 61/828,577, filed May 29, 2013, the entire disclosure of which is hereby incorporated by reference.

FIELD OF INVENTION

The present disclosure generally relates to water filtration systems, and more particularly, to an underdrain assembly and a method of manufacturing the same.

BACKGROUND

Water filtration systems are commonly employed for filtering high volumetric flow rates of liquids, e.g., in municipal and industrial water treatment and waste water treatment plants. Each filtration system generally comprises a filter basin having a floor and vertical walls surrounding the floor, and an underdrain assembly positioned over the floor. A bed of granular filter media for filtering a liquid as it seeps downward through the filter bed is placed on top of the underdrain assembly. The underdrain assembly defines a perforated false bottom in the basin for supporting the filter media bed and for providing a plurality of fluid passageways for both removing the filtered water from the bottom of the filter basin and directing water and/or air into the filter bed during backwashing.

The filter media bed is generally several feet deep and is typically comprised of successive layers of gravel, sand, anthracite, or other granular filter media. The filter media bed for both traditional and gravel-less designs typically transition from coarse sizes near the top of the filter media bed to fine sizes near the bottom. Traditional filter designs place support media, such as multiple gravel layers, with relatively coarse sizes between the fine filter media positioned near the bottom of the filter media bed and the top surface of the underdrain assembly to prevent the finer filter media from entering the underdrain apertures and contaminating the filtered water. Gravel-less filter designs do not use support media, but rather use various types and configurations of porous filters to prevent the granular filter media from entering the underdrain assembly apertures.

During operation of the filtration system, unfiltered water is directed into the filter basin to a depth of several feet above the upper layer of filter media and flows downward though the filter media bed. During this filtration process, suspended materials in the unfiltered water become trapped in the filter media. The water ultimately reaches the bottom of the filter bed and passes through apertures in the underdrain assembly. The water is then collected in passageways within the underdrain assembly and is carried out of the filter basin through a suitable conduit or flume.

After the filtration system is operational for a period of time, the efficiency of the system decreases and it becomes necessary to wash the filter media bed to remove material trapped therein. A backwashing process commonly is utilized to flush the filter media of trapped particles. The backwashing process involves pumping pressurized water and/or air in a reverse direction into the underdrain assembly passageways, through apertures formed in the underdrain assembly, and into the overlying filter media bed. The backwash water flows through the filter media bed and carries the trapped materials upward through the filter bed. The wash water and the materials entrained or suspended therein are then collected at the top of the filter basin and carried away.

During the backwashing operation it is desirable to obtain a uniform distribution of wash water throughout the filter media bed to completely wash the entire filter bed. If the wash water distribution is uneven so that dead spots occur at certain locations within the filter bed, then those portions of the filter bed will be improperly cleansed, thereby reducing the efficiency of the filter. The backwashing process must also be performed under carefully controlled conditions so as to avoid unduly disturbing or damaging the filter media bed. For example, the velocity of the wash water must be controlled at a level below that which would cause the filter media to become entrained in the wash water along with the removed materials and carried away as waste. Explosive bursts of backwash water that open channels in the filter media, typically occurring at the initiation of the backwashing cycle, must be avoided. These open channels allow unfiltered water to pass through the filter media without being filtered and allow finely-sized filter media to be carried away with the filtered water.

SUMMARY

Several underdrain designs have been developed over the years to address some of the aforementioned issues. One type of underdrain utilizes a design in which discrete components are connected together. For example, U.S. Pat. No. 6,797,166 to Hambley et al., which is hereby incorporated by reference in its entirety herein, discloses an underdrain apparatus having a cover member, a water orifice member, and a bottom member, which must be connected together before operation. Further, many existing underdrain designs are manufactured in short discrete lengths, typically two- to four-feet, which are connected together end-to-end during installation. The cross-sectional and end-to-end connection joints are prone to leakage and backwash pressure loss, thus reducing the effectiveness of the underdrain. In addition, these designs generally consist of many parts that must be assembled in the filter media basin, which results in high production, installation, and maintenance costs. Further, these designs typically are heavy, which increases the difficulty and cost of shipping and installing the underdrains.

In addition to segmented designs, existing underdrain assemblies typically utilize porous filter media or caps which are situated on top of the underdrain system to serve as an additional filtering mechanism before the unfiltered water enters the underdrain assembly. These caps, commonly porous plates, are screwed into place on the top of the underdrain or held in place with the use of gaskets. Either way, installation of the porous plates is rather difficult and inefficient, making it a time-consuming and costly procedure. In addition, after a period of use, the porous plates must be removed and replaced.

U.S. Pat. No. 6,740,237 to Roberts et al. ("Roberts"), which is hereby incorporated by reference in its entirety herein, attempts to solve some of the aforementioned problems. Roberts provides an extruded underdrain block with a plurality of orifices. The underdrain blocks of Roberts have fewer components than many existing underdrain systems; however, Roberts' extruded underdrain blocks are prone to failure due in part to the box cross-sectional design having a plurality of intersecting walls. Further, the underdrain blocks of Roberts utilize a porous plate interconnected to the underdrain block by a separate extrusion member. The separate extrusion member is prone to failure during installation and backfill of the filter media bed prior to operation. Furthermore, in utilizing the invention disclosed in Roberts, it is necessary to stagger the extruded underdrain blocks with structural members to further support the underdrain block, which reduces the surface area of the underdrain assembly.

In summary, many existing underdrain assemblies are heavy structures, which increase the difficulty and cost of shipment and installation. Further, existing underdrain assemblies are very complex and typically consist of many parts. This complexity, from which many drawbacks result, creates significantly high production costs as well as high costs of labor in installing and maintaining the underdrain assembly.

Thus, there is a need to provide an underdrain assembly, and a method of manufacturing the underdrain assembly, that has fewer components and a relatively light weight, yet has the strength to withstand installation and operational forces, including the downward forces exerted by the filter media bed.

The present disclosure is generally directed to an underdrain assembly for use in connection with a filter media bed in a liquid filtration system. In various embodiments, an extruded underdrain apparatus is provided that comprises a unitary part, thus decreasing the transportation, assembly, installation, and maintenance costs.

One aspect of the present disclosure is to extrude an underdrain apparatus using a formable material. In an embodiment, the extruded underdrain apparatus is constructed of an extrudable material, which may be selected based upon the desired shape and material properties of the underdrain apparatus. Extrudable materials include, but are not limited to, metals, polymers, and ceramics. Extrudable metals include, but are not limited to, aluminum and steel. Extrudable polymeric materials include, but are not limited to, polyvinyl chloride (PVC), chlorinated polyvinyl chloride (CPVC), high density polyethylene (HDPE), and other thermoplastic materials. The ability to extrude the underdrain apparatus reduces assembly and installations costs, and thus is advantageous over existing underdrain apparatus.

Another aspect of the present disclosure is to extrude an underdrain apparatus as a unitary part. In an embodiment of the present disclosure, the underdrain apparatus includes a cover member and a water drain member extruded as a single component. In some embodiments, the underdrain apparatus is extruded with orifices. This removes the extra step of forming the apertures after extruding the underdrain apparatus. Additionally, this removes the necessity of plugging undesired apertures resulting during the formation of internal apertures, as is required by many existing underdrain processes.

Yet another aspect of the present disclosure is to extrude an underdrain apparatus in long sections, which may include lengths up to and exceeding twenty-five feet. In some embodiments, the underdrain apparatus can be extruded to match the length dimension of the filter basin. In these embodiments, the underdrain apparatus minimizes end-to-end connection joints, thus improving the efficiency of the underdrain assembly.

A further aspect of the present disclosure is to extrude an underdrain apparatus in various shapes. In some embodiments, extruded shapes include, but are not limited to, trapezoidal, triangular, rectangular, square, circular, and elliptical. In addition, in some embodiments, an extruded underdrain apparatus has a cover member and a water drain member. In these embodiments, the cover member and the water drain member may be extruded in various shapes, which may be different from each other. The extruded shape is based upon overall size, including height and width, weight, strength, and passageway volume considerations.

Another aspect of the present disclosure is to provide an underdrain assembly including a plurality of underdrain apparatus. In some embodiments, the underdrain apparatus are interconnected together side-by-side to cover the floor of a filter basin. For example, the underdrain apparatus can be welded, bonded, bolted, screwed, riveted, or interconnected using other suitable interconnection methods known in the art. In some embodiments, multiple underdrain apparatus are extruded side-by-side as a unitary part. In these embodiments, the underdrain assembly joints are further reduced, resulting in enhanced performance of the underdrain assembly.

Methods for manufacturing an underdrain assembly according to embodiments of the present disclosure are also provided. In addition, methods of filtering unfiltered water through an underdrain assembly of embodiments of the present disclosure as well backwashing a liquid filtration system and underdrain assembly of embodiments of the present disclosure are provided. In some embodiments, an extrudable material is extruded in long sections to provide a light weight, strong, and durable underdrain apparatus. In some embodiments, orifices are formed in the underdrain apparatus during the extrusion process, thus removing the step of drilling, punching, or otherwise forming orifices in the underdrain apparatus after extrusion as required in existing processes. After extrusion, in some embodiments, the underdrain apparatus are interconnected side-by-side to form an underdrain assembly that covers a floor of a filter basin.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise indicated, all numbers expressing quantities of ingredients, dimensions reaction conditions and so forth used in the specification and claims are to be understood as being modified in all instances by the term "about".

The Summary is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description given above and the detailed description of the drawings given below, serve to explain the principles of these embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

DETAILED DESCRIPTION

Figure 1:
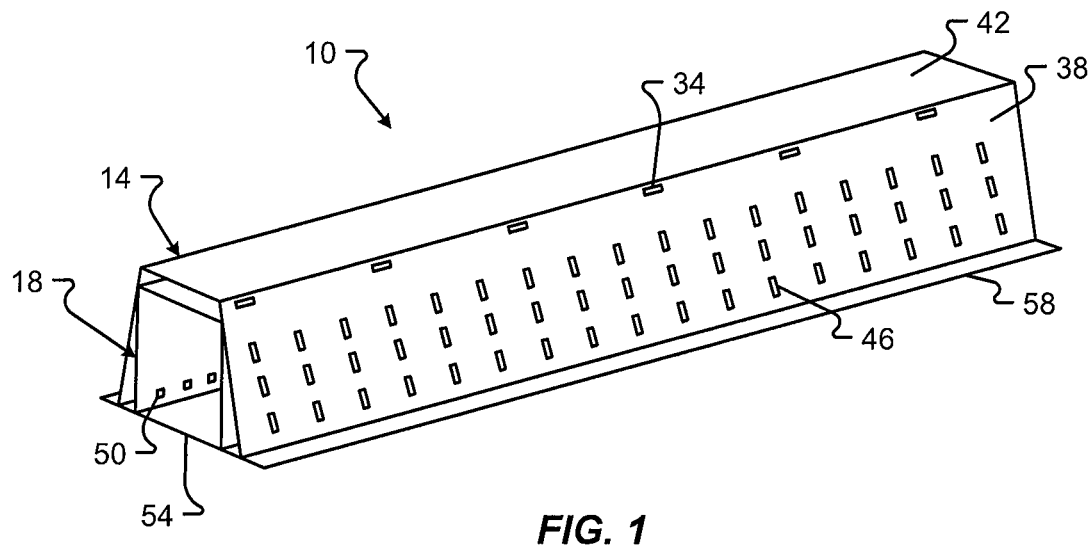
FIG. 1 is a perspective view of an extruded underdrain apparatus according to an embodiment of the present disclosure.
Figure 2:
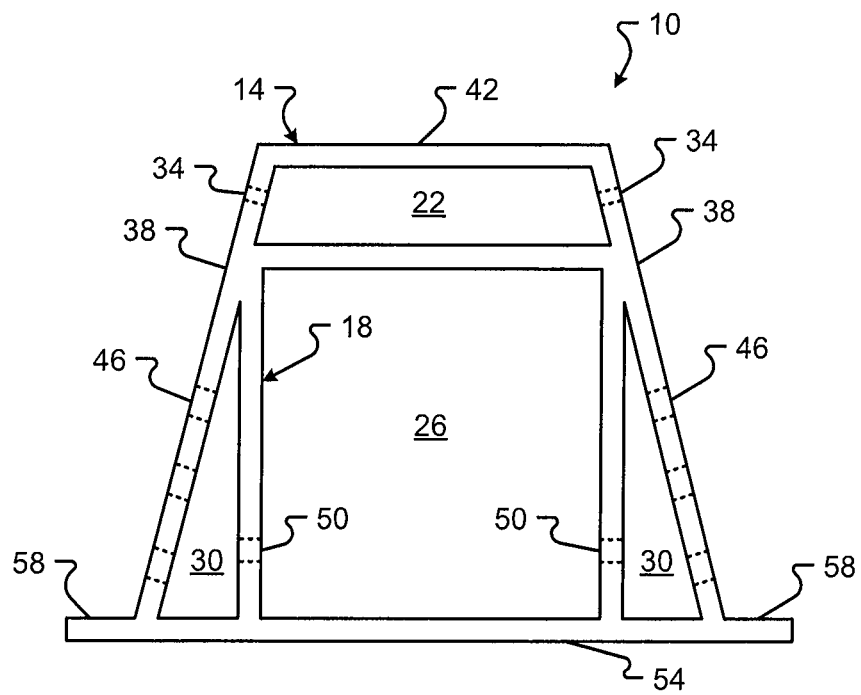
FIG. 2 is an end view of the extruded underdrain apparatus shown in FIG. 1.

FIGS. 1-8 generally depict embodiments of an underdrain apparatus for use in connection with filter media systems. Referring to FIGS. 1-2, an underdrain apparatus 10 according to an embodiment of the present disclosure is illustrated. The depicted underdrain apparatus 10 has been extruded as a unitary part and generally comprises a cover member 14 and a water transport member 18. The underdrain apparatus 10 has an air passageway 22, a water passageway 26, and an intermediary passageway 30 that interconnects the water passageway 26 with the filter media bed. In some embodiments, a porous filter may be positioned within the intermediary passageway 30 to further filter the water before it enters the water passageway 26.

In the depicted embodiment, air orifices 34 are formed in the sides 38 of the cover member 14 and are in fluidic communication with the air passageway 22. The air orifices 34 are utilized to scour the filter media with pressurized air. Air scouring can improve the removal of impurities in the filter media, and may be utilized during water backwash of the filter media. As illustrated, the air orifices 34 are intermittently positioned along the length of underdrain apparatus 10. As can be appreciated, the number, size, shape, and location of the air orifices 34 may vary depending on the desired performance of the air scour operation. Additionally, the direction of the air orifices 34 may be varied to ensure that the filter media is thoroughly scoured. As illustrated, the air orifices 34 are formed in the sides 38 of the cover member 14 and not in the top 42 of the cover member 14. This positioning ensures that the air scour operation will remove impurities in the filter media located between adjacent underdrain apparatus 10.

Water orifices 46 also are formed in the sides 38 of the cover member 14 and are in fluidic communication with the water passageway 26 via internal orifices 50. The water orifices 46 and the internal orifices 50 act as water inlets during the filtration cycle and water outlets during the backwash cycle. By increasing or decreasing the number and/or size of water orifices 46 and/or internal orifices 50, the quantity of water passing between the filter media and the water passageway 26 can be varied as desired. The water orifices 46 in FIGS. 1-2 are positioned in three parallel rows and are the same size. As can be appreciated, each water orifice 46 can vary in size and position.

Generally, the air orifices 34 and the water orifices 46 allow air and water to exit on both sides 38 of the underdrain apparatus 10. As can be appreciated, the size of the orifices may be adjusted to release more or less air or water as is desirable in a particular operating environment. For example, the orifices may be smaller in certain filter beds to prevent the migration of filter media through the orifices. Additionally, the size and spacing of the orifices are dependent on practical issues regarding hydraulic considerations, structural capacity, and manufacturing concerns as well as on the size and type of filter media placed on top of the underdrain. For example, design criteria include the desired flow rate, head loss, and distribution characteristics.

The underdrain apparatus 10 depicted in FIGS. 1-2 also has a bottom 54 that extends beyond the sides 38 of the cover member 14 to define flanges 58. The flanges 58 may be utilized to interconnect adjacent underdrain apparatus 10 to form an underdrain assembly. The interconnection between adjacent underdrain apparatus 10 can be accomplished, for example, by adhesives, fasteners, and welding, including spot welding and ultrasonic welding.

To manufacture the underdrain apparatus 10 illustrated in FIGS. 1-2, an extrusion process is utilized. The extrusion process according to one embodiment generally includes heating a formable material to its melting point, directing the material through a die to form the desired cross section, and maintaining the desired shape until the part has cooled enough to become dimensionally stable. In some embodiments, the air orifices 34, the water orifices 46, and/or the internal orifices 50 are formed during the extrusion process. Forming the orifices during the extrusion process eliminates the extra step of forming the orifices after the extrusion process has been completed as is required by existing underdrain manufacturing processes. Various process parameters, including material temperature, material flow rate, production rate, exit temperature, and cooling air flow, are controlled to properly cool the extruded form to maintain its structural integrity.

By extruding an underdrain apparatus 10 in long sections as a unitary part, the resulting underdrain assembly comprises fewer components and is less complex than the existing underdrain systems. For example, an underdrain apparatus 10 may be extruded to the length dimension of the filter basin to reduce the necessity of interconnecting underdrain apparatus 10 end-to-end. Additionally, in some embodiments, multiple underdrain apparatus 10 may be extruded side-by-side to further reduce the number of connection joints in the underdrain assembly. By using materials such as an extrudable polymeric plastic, the resulting underdrain assembly is lighter than existing underdrain systems. Fewer components and lighter components make the underdrain apparatus 10 easier to ship, assemble, install, and maintain. Generally, maintenance costs are reduced because there are less components that can malfunction.

Although not depicted, an end plate may be interconnected to both ends of the underdrain apparatus 10 to seal the ends of the underdrain apparatus 10. In some embodiments, end plates are formed out of the same material as the underdrain apparatus 10 and are shaped to fit the cross-section of the underdrain apparatus 10. The end plate may include an air inlet for injecting pressurized air into the air passageway 22 during air scouring and a water inlet for injecting water into the water passageway 26 during backwashing. Additionally, the end panel may include a water outlet to act as a conduit for filtered water to flow out of the filter basin during filtration. A single feature may act as both the water inlet and the water outlet.

In operation, underdrain apparatus 10 are placed on a floor of a filter basin. Adjacent underdrain apparatus 10 are interconnected to define an underdrain assembly that covers the filter basin floor. Then, filter media is positioned on top of the underdrain assembly to define a filter media bed. The filter media bed is typically comprised of successive layers of gravel, sand, anthracite, or other granular filter media. Unfiltered water is directed into the filter basin and flows downward through the filter media bed, which removes impurities from the unfiltered water. The water ultimately reaches the bottom of the filter bed and passes through the water orifices 46 into the water passageway 26, which transports the filtered water to a conduit which carries the filtered water out of the filter basin.

After the filtration system has been operational for a period of time, the efficiency of the system decreases due to trapped suspensions. To flush out the trapped impurities, filtered water is flowed through the water passageway 26, out of the orifices 46, 50, and upward through the filter media bed during a backwash operation. This fluidizes the filter media and rinses out the dislocated particles from the interstitial voids. The backwash operation also loosens the filter media bed to eliminate packing and established flow channels. After the backwash water is discharged, filtration is resumed. In addition to backwashing the filter media, air scouring may be performed to further loosen and clean the filter media. During air scouring, pressurized air is flowed through the air passageway 22, out of the orifices 34, and into the filter media bed.

Figure 3:
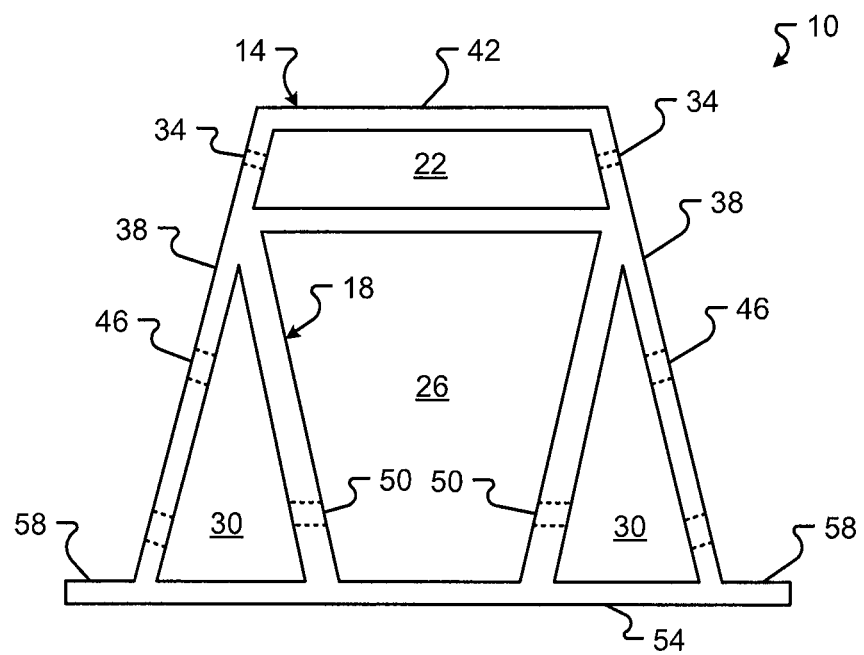
FIGS. 3-8 are end views of alternative underdrain apparatus according to embodiments of the present disclosure.
Figure 4:
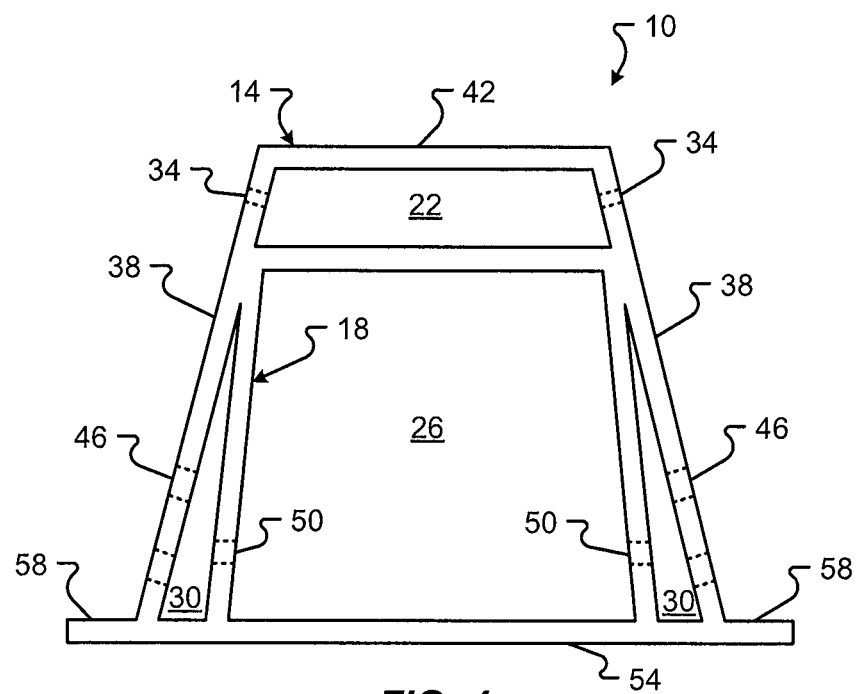
Figure 5:
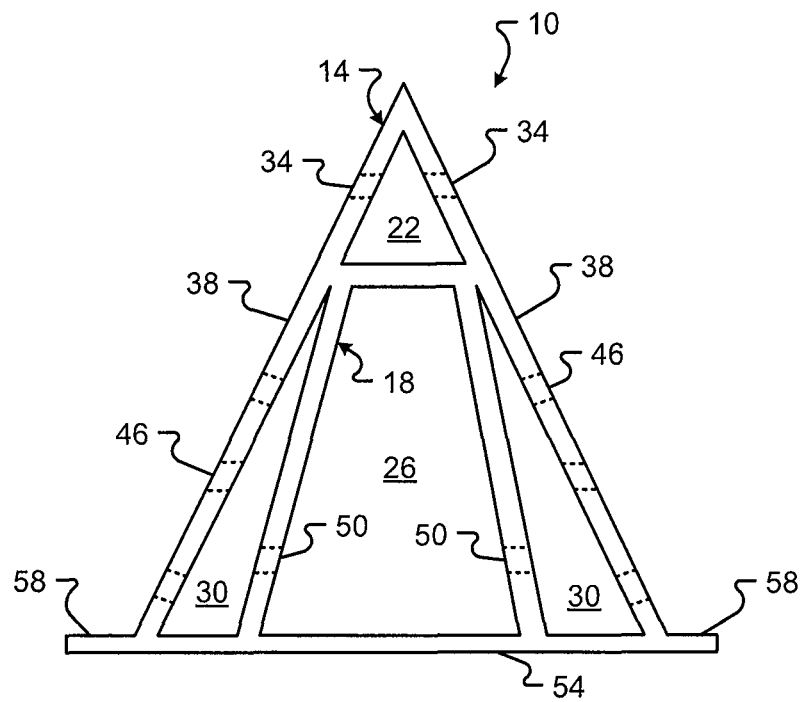
Figure 6:
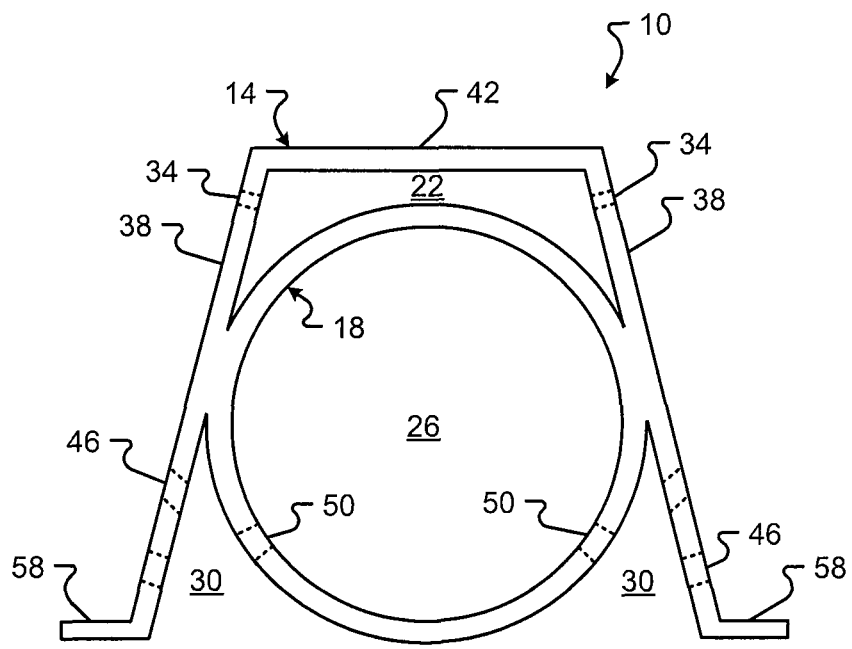

There are many cross-sectional designs that can be extruded according to embodiments of the present disclosure. For example, FIGS. 3-6 show alternate embodiments of an underdrain apparatus 10. As shown in FIGS. 3-4, an underdrain apparatus 10 includes a trapezoidal cover member 14 and a trapezoidal water transport member 18. FIG. 3 depicts an inverted trapezoidal water transport member 18, which decreases the size of the water passageway 26 and increases the size of the intermediary passageways 30. FIG. 4 depicts a trapezoidal water transport member 18, which increases the size of the water passageway 26 and decreases the size the intermediary passageways 30. Referring to FIG. 5, an underdrain apparatus 10 includes a triangular cover member 14 and a trapezoidal water transport member 18. The triangular shape of the cover member 14 eliminates the filter media from laying on a top surface of the underdrain apparatus 10. Referring to FIG. 6, an underdrain apparatus 10 includes a trapezoidal cover member 14 and a circular water transport member 18. As depicted in FIG. 6, the water transport member 18 is integrally extruded with the sides 38 of the cover member 14. In an alternative embodiment, the water transport member 18 may be integrally extruded with the top 42 of the cover member 14 as well, thus splitting the air passageway 22 into two passageways. In this alternative embodiment, the water transport member 18 provides additional stiffness to the top of the cover member 14.

Figure 7:
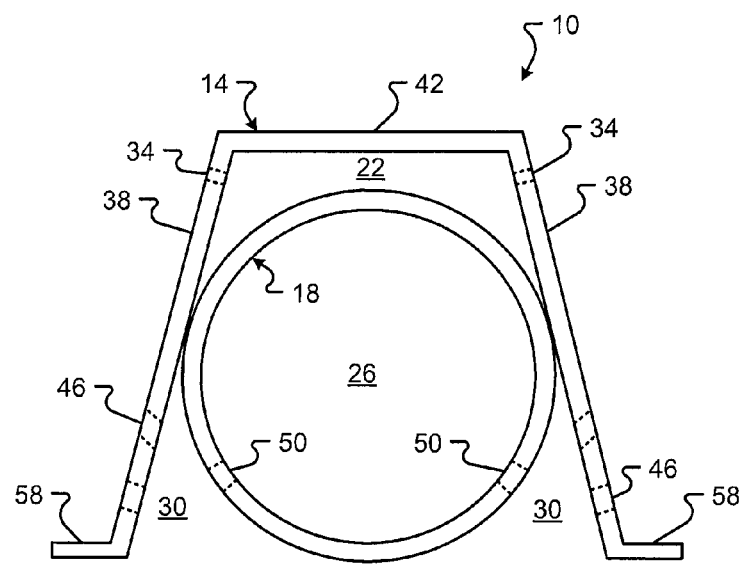

FIG. 7 illustrates another embodiment of an underdrain apparatus 10. As depicted, the underdrain apparatus 10 includes a trapezoidal cover member 14 with a flange 58 and a circular water transport member 18. The cover member 14 and the water transport member 18 are not extruded as a unitary part. Rather, the cover member 14 and the water transport member 18 are formed prior to assembly and ultrasonically welded together to provide a seal between the air passageway 22 and the intermediary passageways 30. In some embodiments, the cover member 14 is constructed of a different material than the water transport member 18. For example, the cover member 14 may be constructed of stainless steel and the water transport member 18 may be constructed of polyvinyl chloride.

Figure 8:
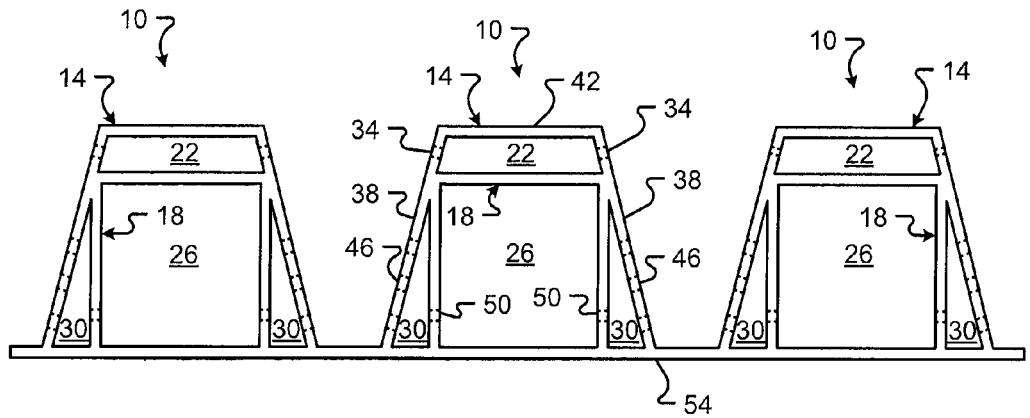

FIG. 8 illustrates an embodiment of three underdrain apparatus 10 extruded as a unitary part. As discussed above, embodiments of the present disclosure can be extruded in relatively long sections, up to and exceeding twenty-five feet, to reduce the necessity of joining successive underdrain apparatus 10 in an end-to-end fashion. As illustrated in FIG. 8, another embodiment of the present disclosure extrudes a plurality of adjacent underdrain apparatus 10 as a unitary part. This reduces the necessity to join adjacent apparatus 10 in a side-to-side fashion. Further, as discussed above, in some embodiments the orifices may be formed during the extrusion process. Thus, embodiments of the present disclosure provide an underdrain apparatus 10 that reduces the assembly, installation, and maintenance costs of existing underdrain assemblies. Further, various cross-sectional shapes can be extruded to achieve a light weight, yet durable underdrain apparatus 10 that can withstand the weight of a filter media bed positioned on top of the underdrain apparatus 10.

The present disclosure has been presented for purposes of illustration and description, and is not intended to be exhaustive or limiting. In addition, while various embodiments, configurations, and/or aspects of the present disclosure have been described in detail, it is apparent that modifications and alterations of those embodiments, configurations, and/or aspects will occur to those skilled in the art. For example, while the flowcharts have been discussed and illustrated in relation to a particular sequence of events, it should be appreciated that changes, additions, and omissions to this sequence can occur without materially affecting the operation of the disclosed embodiments, configuration, and aspects. Further, while various features have been grouped together in one or more embodiments, configurations, and/or aspects, it should be appreciated that these features may be combined in alternate embodiments, configurations, and/or aspects other than those discussed above. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. An underdrain apparatus comprising:
   a trapezoidal cover member that includes:
   a first generally planar surface;
   a second generally planar surface adjacent at least a first side of the first generally planar surface;

a third generally planar surface adjacent to at least a second side of the first generally planar surface, wherein a plurality of orifices extends through at least one of said first, second and third generally planar surfaces; and a substantially cylindrical body connected to at least one of said second and third generally planar surfaces, and is not connected to said first generally planar surface, said substantially cylindrical body comprising a water transport member that has apertures through a lowermost half of the substantially cylindrical body, said second and third generally planar surfaces each having an edge that rests on a floor when the underdrain assembly is installed.

2. The underdrain apparatus according to claim 1 wherein the underdrain apparatus is formed of a formable material.

3. The underdrain apparatus according to claim 1 wherein the underdrain apparatus is formed by extrusion.

4. The underdrain apparatus according to claim 1 wherein an angle formed between the first generally planar surface and the second generally planar surface and an angle between the first generally planar surfaces and the third generally planar surface are obtuse angles.

5. The underdrain apparatus according to claim 1 wherein said cylindrical body is connected to the second generally planar surface.

6. The underdrain apparatus according to claim 1 wherein the apertures in the substantially cylindrical body are located about a longitudinal direction of the substantially cylindrical body.

7. The underdrain apparatus according to claim 1 wherein the substantially cylindrical body comprises a material selected from the group consisting of a metal, a polymer, a ceramic material, an aluminum material, a steel material, a polyvinyl chloride (PVC), a chlorinated polyvinyl chloride (CPVC), a high density polyethylene (HDPE), and a thermoplastic material.

8. The underdrain apparatus according to claim 1, wherein the substantially cylindrical body is not attached to an upper region of the trapezoidal cover member.

9. The underdrain apparatus according to claim 1, wherein the trapezoidal cover member includes a flange.

* * * * *